United States Patent [19]

Schweigert

[11] Patent Number: 5,070,687
[45] Date of Patent: Dec. 10, 1991

[54] GRASS COLLECTOR APPARATUS AND METHOD

[75] Inventor: James R. Schweigert, Plymouth, Minn.

[73] Assignee: JRCO, Inc., Minneapolis, Minn.

[21] Appl. No.: 385,739

[22] Filed: Jul. 26, 1989

[51] Int. Cl.$^5$ .......................................... A01D 34/70
[52] U.S. Cl. ...................................... 56/202; 56/16.6; 56/DIG. 9; 298/6
[58] Field of Search ................ 56/202, 16.6, 194, 199, 56/205, 206, DIG. 9; 298/5, 6, 7, 23 C, 38; 296/98, 100; 280/47.31

[56] References Cited

U.S. PATENT DOCUMENTS

| | | | |
|---|---|---|---|
| 3,974,631 | 8/1976 | Rhodes | 56/202 |
| 4,532,755 | 8/1985 | Schemelin et al. | 56/16.6 |
| 4,699,393 | 10/1987 | Schweigert | 56/202 |
| 4,787,197 | 11/1988 | Schweigert | 56/202 |
| 4,836,610 | 6/1989 | Doering et al. | 298/6 |
| 4,922,696 | 5/1990 | Burno et al. | 56/202 |

OTHER PUBLICATIONS

"JRCO Cart Bagger Grass Collector for John Deere 100, 200, 300 and 400 Tractors with the Power Flow Unit"; by JRCO, Inc.; 1986.
"Tough as They Come. 1989"; by Murray Ohio Manufacturing Company, (undated).
"Instruction Book Vac Wagon"; by Murray Ohio Manufacturing Company; (undated).
"Grass and Leaf Collection Systems"; by Simplicity Manufacturing Inc.; 1988.
"Draft 8-29-88",by Simplicity Manufacturing, Inc.; Aug. 1988.
"Vanguard: To Boldly Mow Like You've Never Mowed Before"; by Deutz-Allis Corporation; (undated).
"Bolens: Lawn & Garden Power Products"; by Bolens Corporation; (undated).
"Dixon: ZTR Riding Mowers"; by Dixon Industries, Inc.; 1988.
"Mills Fleet Farm: 1989 Spring/Summer catalog"; p. 6; by Mills Fleet Farm; 1989.

Primary Examiner—Terry L. Melius
Attorney, Agent, or Firm—Merchant, Gould, Smith, Edell, Welter & Schmidt

[57] ABSTRACT

The grass collector venting cover assembly of the present invention includes a cover constructed of both porous and non-porous sections. The top of the venting cover assembly consists of two layers; the lower one being porous and the upper one being non-porous. The two layers are connected to allow the cover to vent dirt and debris from the grass chute away from the tractor operator. The cover support frame work supports the cover and allows emptying of the cart without interference from the cover. The grass collector/bagger of the present invention includes a collector support frame work with a rigid hitch for attachment to a tractor; two removable bins each containing two or more reusable, flexible insert containers; and a cover support assembly for supporting a cover above the rigid bins. The cover of the grass collector/bagger can also be of the venting type described above.

13 Claims, 9 Drawing Sheets

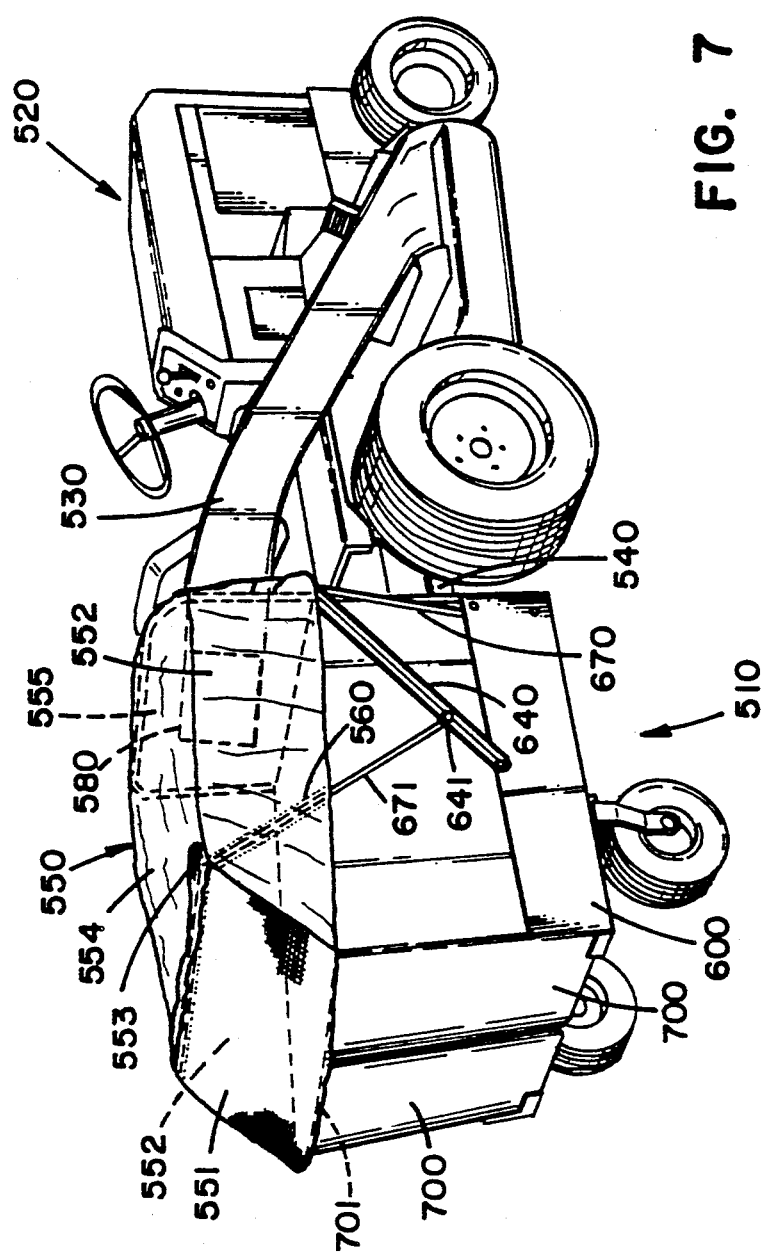

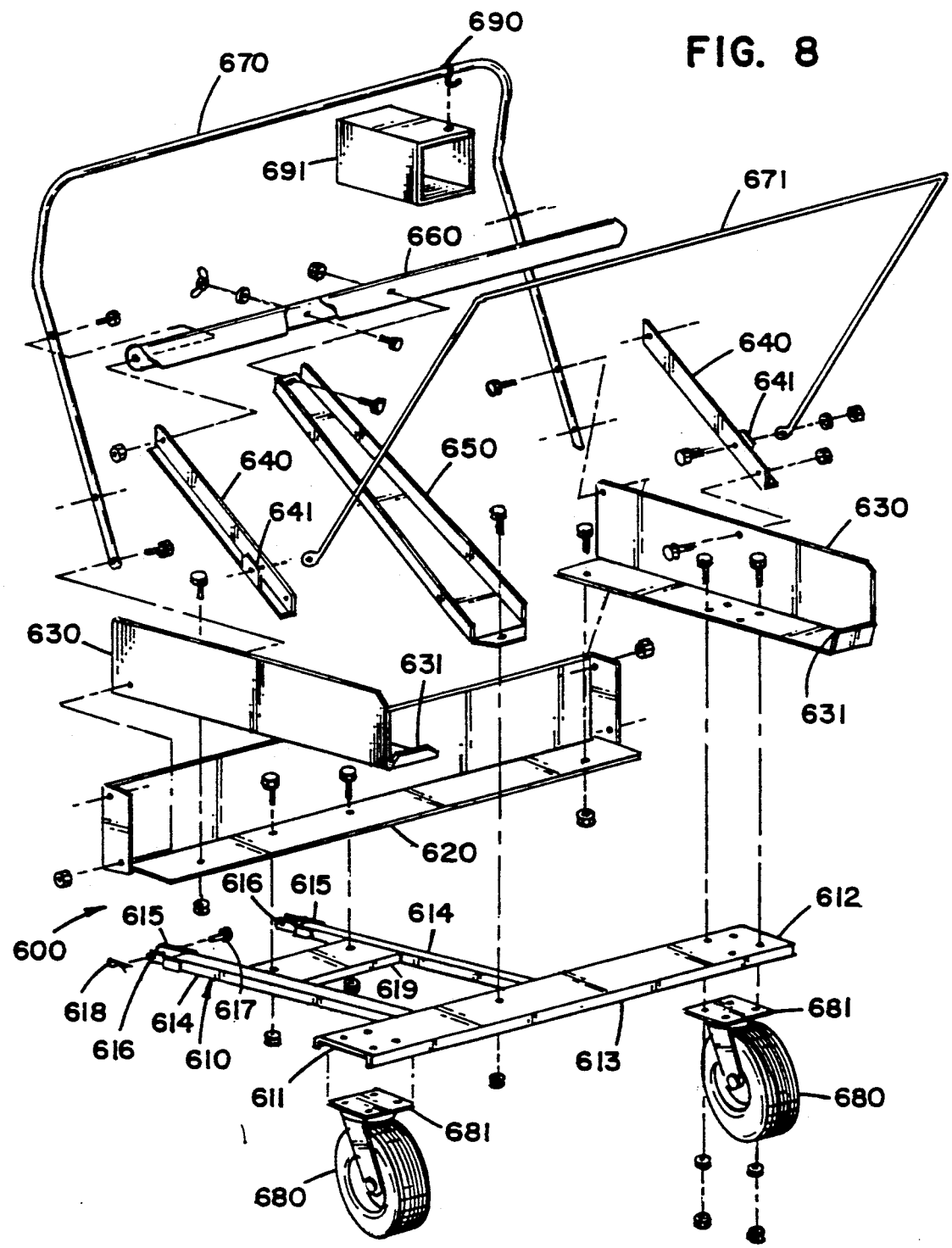

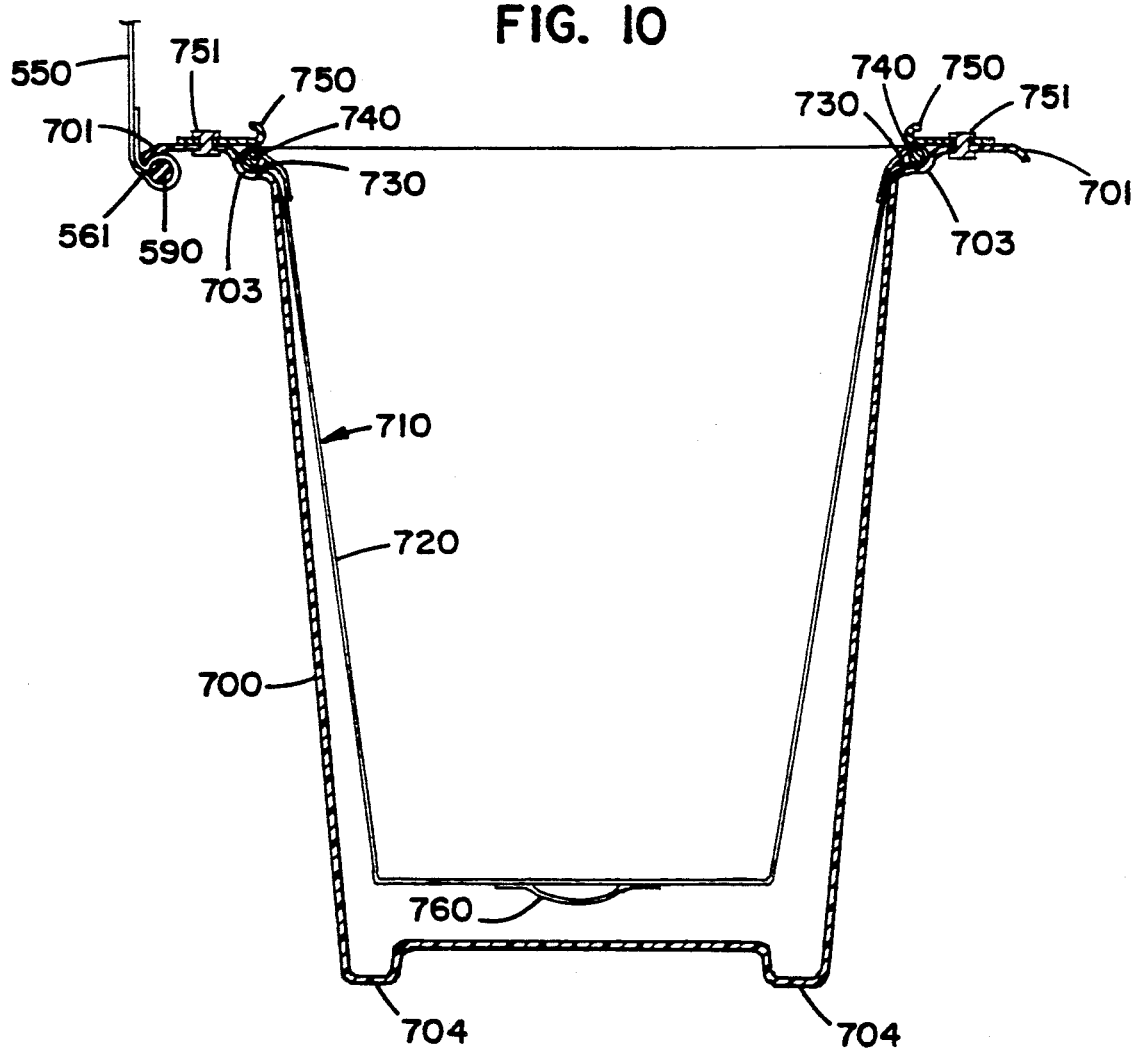
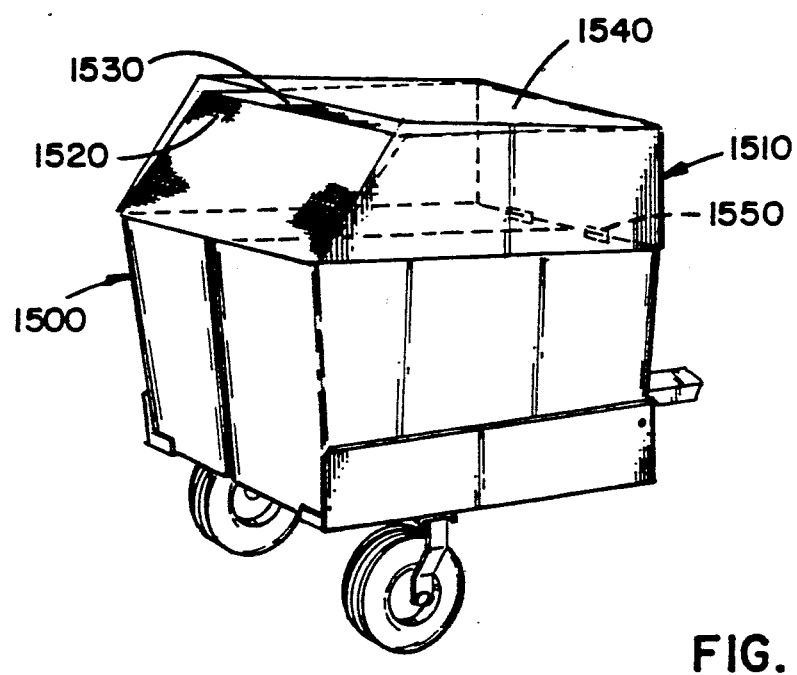

GRASS COLLECTOR APPARATUS AND METHOD

FIELD OF THE INVENTION

The present invention relates to a grass collector venting cover assembly and a grass collector/bagger with a rigid hitch for use with lawn and garden tractors, riding mowers and the like. More particularly, the present invention relates to a grass collector venting cover assembly and a grass collector/bagger, both adapted for receipt of grass clippings from the grass chute of a lawn and garden tractor or riding mower, or the like.

BACKGROUND OF THE INVENTION

Grass collectors which are pulled behind riding mowers and lawn and garden tractors are becoming increasingly popular. Hereinafter only tractors will be referred to but it should be understood that the term includes riding mowers as well as both lawn and garden tractors.

One type of grass collector is a single or dual grass bagger which is supported on a frame behind the tractor, the bagger frame is sometimes supported above the surface of the ground by a plurality of wheels. A grass chute extending from the mower housing is interconnected to the bagger so as to provide a path for the flow of grass clippings from the mower to the bagger. With some tractors having a two-or three-blade mower deck, an auxiliary engine driven blower or a mower belt or shaft driven blower is required in order to provide sufficient force to transport the grass clippings into the bagger.

Smaller tractors having one- or two-blade mower decks often utilize "high lift" blades so that sufficient force is provided by the design of the blade itself and an auxiliary blower is not required. However, many of the grass collectors which rely on high lift blades have metal, plastic or cloth sides which do not allow air to move freely through the grass collector. As a result, there is pressure build-up within the grass collector which prevents the free flow of air needed to transport the grass into the bagger, so that a ventilation screen must often be provided.

Currently available vacuum grass collectors which have an auxiliary engine are rather expensive. If a cart is provided in conjunction with the grass collector, the collectors typically mounted on a cart having a non-rigid hitch which is difficult to backup and which is easily tipped on hills when full. Another problem is that conventional grass collectors and baggers are often too tall to allow mowing in the proximity of low tree branches.

In addition, many grass collectors require a rather complicated mounting hitch arrangement to enable attachment to the tractor.

Furthermore, many of the commercially available baggers are difficult to unload or have limited capacities. Those without separate bins can only be emptied by dumping the contents on the ground rather than into a garbage container or dumpster. Some utilize an auxiliary engine-driven blower which empties into a large barrel which is difficult for an operator to lift and otherwise manipulate. Those with separate bins must use small bins to limit the bins' weight for emptying by the operator into a garbage container or dumpster. The limited size of the bins is inefficient because the operator must empty more bins even if the material in the bins is light enough to allow the operator to lift a larger bin.

Another problem with some commercially available baggers and grass collectors is that the standard grass collector cover assemblies are constructed so as to allow dust and debris from the exhaust of the grass chute to blow forward, thereby irritating the tractor operator.

As previously issued, U.S. Pat. Nos. 4,699,393 and 4,787,197 show grass collecting devices which solve some, but not all, of the above problems associated with grass collectors.

The present invention solves these and many other problems associated with currently available grass collectors.

SUMMARY OF THE INVENTION

The present invention relates to a grass collector for attachment to a tractor which is adaptable for receipt of grass clippings from a grass chute of the tractor.

The grass collector venting cover assembly of the present invention includes a flexible or rigid cover constructed of both porous and non-porous sections. The top of the venting cover assembly consists of two layers; the lower one being porous and the upper one being non-porous. The two layers are connected along both sides and along the front of the cover assembly while the rear edges of the two layers are left unconnected. That construction allows the cover assembly to vent dirt and debris from the grass chute away from the tractor operator. The cover support frame work of the cover assembly allows the cover to be raised from its closed position to allow emptying of the cart without interference from the cover.

In one embodiment, the grass collector/bagger of the present invention includes a collector support framework having a back end facing away from the tractor and a front end proximate the tractor. The collector support framework includes rigid hitch means for attachment to the tractor and is supported above the ground by at least one wheel. The wheels are pivotally interconnected to the collector support framework for pivotal motion about a generally vertical axis. The wheels are located closer to the back end of the collector support framework than the front end.

The collector/bagger further includes at least one removable bin supported above the surface of the ground by the collector support framework, two or more insert containers adapted to fit inside each removable bin, and a collapsible cover assembly for covering the removable rigid bin or bins. The collapsible cover assembly is movable between open and closed positions. The open position allows the bin or bins to be removed from the collector/bagger and emptied. In its closed position the cover contains grass clippings or other materials within the space defined by the collapsible cover assembly and removable rigid bin. The cover assembly also includes means for receiving grass clippings from the grass chute of the tractor.

One embodiment of the present invention is particularly advantageous in that it provides for a unique grass collector venting cover assembly. The cover assembly's principle advantage is that it vents dirt and debris entering a grass collector away from the operator of the tractor towing that collector.

Yet another embodiment of the present invention is particularly advantageous in that it provides for a unique grass collector/bagger using removable rigid bins for collecting grass clippings and other material. The rigid bins can be used alone or with smaller insert containers depending on the operator's preference. The preferred embodiment of the grass collector/bagger uses two removable rigid bins and four insert containers, with two insert containers fitting inside each rigid bin. The collector/bagger assembly can be covered with a standard grass collector cover assembly or the grass collector venting cover assembly of the present invention for venting dirt and debris away from the tractor operator.

The rigid bins of one embodiment of the present invention are advantageous in that their bottoms contain an indentation particularly adapted for serving as a handhold during unloading of the bins. They are also constructed of a black polyethylene material to reduce the amount of deterioration of the bins from ultraviolet radiation.

The insert containers of the preferred embodiment consist of polyester bags which narrow from their top opening to their bottom. In addition, they also have handles on their bottoms to aid in dumping the contents of the bags. They are advantageous in that the tapering and polyester material aid in the removal of the insert containers from the rigid bins. Another advantage of the insert containers is that the porous polyester material aids in the compaction of the grass clippings. The insert containers are also advantageous because each one contains a structural member in a sleeve around the circumference of its opening to keep it open. The rod also allows the insert containers to be lined with plastic bags if desired by the operator.

Another advantage of the present invention is that the grass collector/bagger bins can be used to haul material, such as water or dirt, behind a tractor in addition to holding grass clippings or other material from the grass chute of the tractor.

Another advantage of one embodiment of the present invention is that the cover is partially made of a perforated polyvinyl chloride material which can be easily cleaned by spraying with a garden hose.

Another advantage of the preferred embodiment of the grass collector/bagger is that it has a capacity of approximately twenty-five (25) cubic feet.

Another advantage of an embodiment of the present invention is its inexpensive nature.

Another advantage of the present invention is its adaptability to different types of tractors. The present invention uses the same grass chute, high lift blades, and baffles normally used for the tractor's rear bagger. If the tractor has high lift blades, then no auxiliary blower is generally required. If an auxiliary blower is provided, the grass collector of the present invention can be used therewith. Also, the present invention can accommodate the tractor's grass chute, and the cover can be fitted for either side entry or front entry of the grass chute. An embodiment of the present invention can also accommodate a customized hitch which conforms with the particular construction of the tractor with which it will be used.

These and other various advantages and features of novelty which characterize the invention are pointed out with particularity in the claims annexed hereto in forming a part hereof. However, for better understanding of the invention, its advantages, and objectives obtained by its use, reference should be made to the drawings which form a further part hereof, and to the accompanying descriptive matter, in which there is illustrated and described the preferred embodiment of the invention.

BRIEF DESCRIPTION OF THE DRAWINGS

In the Drawings, reference numerals and letters indicate corresponding parts throughout several views.

FIG. 7 is a perspective view of the collector/bagger assembly of the present invention illustrating the rigid bins and insert containers, with the collector/bagger assembly connected to a tractor;

FIG. 8 is an enlarged exploded perspective view of the embodiment of the collector/bagger assembly support framework shown in FIG. 7;

FIG. 10 is a partial cross-sectional view of a rigid bin, cover, and insert container of the preferred embodiment of the grass collector/bagger assembly of the present invention;

FIG. 15 is a perspective view of an alternative embodiment of the grass collector/bagger assembly.

DETAILED DESCRIPTION OF THE PREFERRED EMBODIMENT

Figure 1:
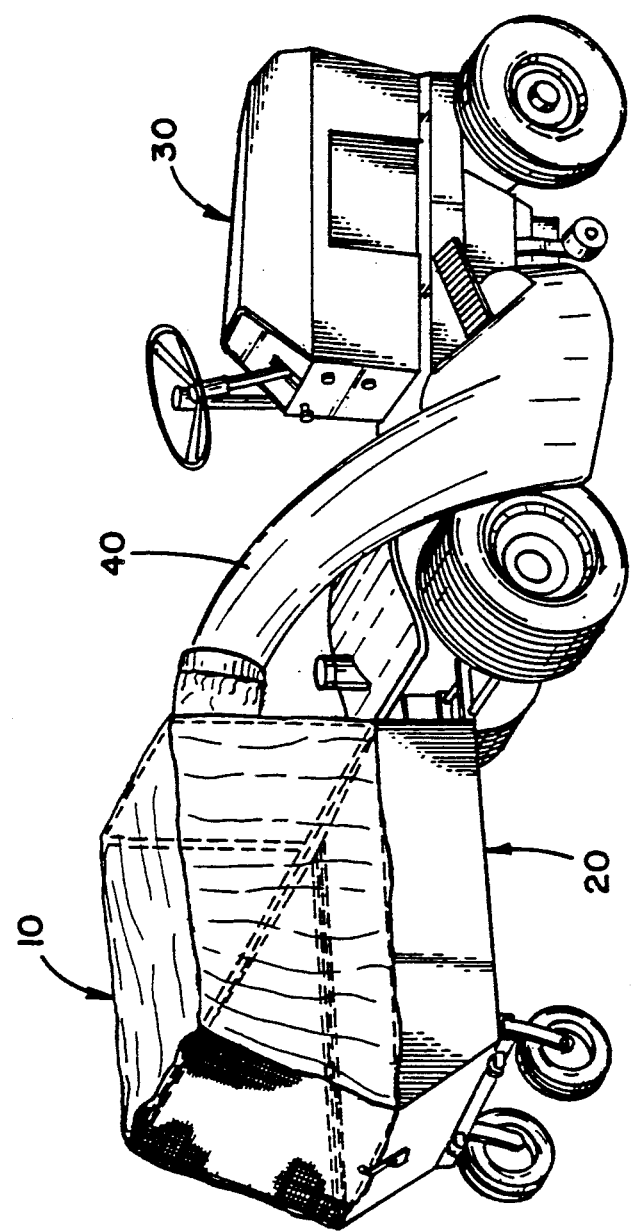
FIG. 1 is a view in perspective of an embodiment of a grass collector venting cover assembly mounted on a cart in accordance with the principles of the present invention, the cart being interconnected to a tractor.

Referring now to the drawings, an embodiment of the present invention is shown in FIG. 1, generally designated by the reference numeral 10 interconnected to a cart 20 which is in turn connected to a garden tractor 30 and grass chute 40.

The height of the cart 20 and grass collector venting cover assembly 10 of the present invention is rather low, preferably about forty-two (42) inches, to enable the tractor to operate close to low hanging trees and other obstructions.

Figure 2:
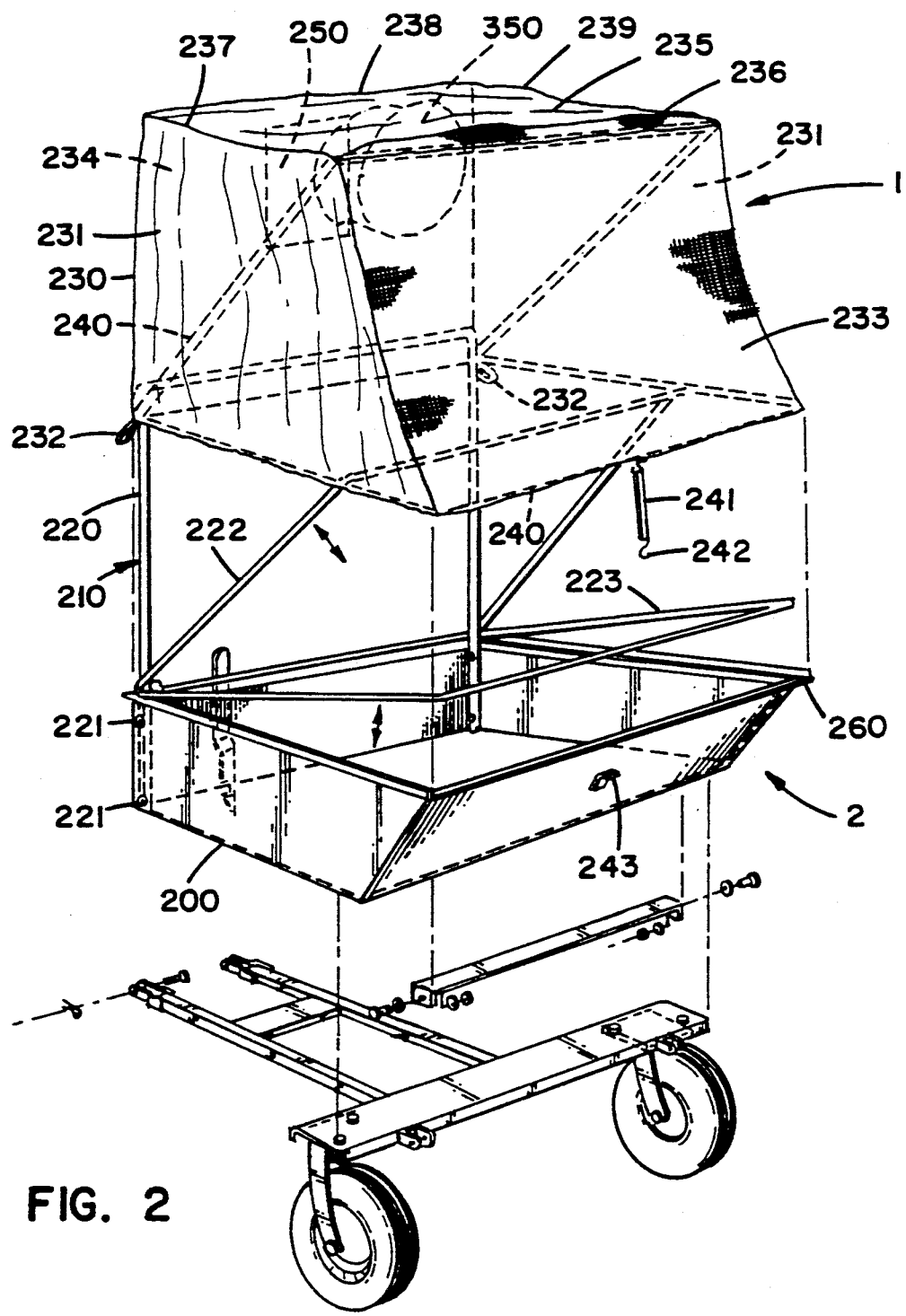
FIG. 2 is an enlarged exploded perspective view of the embodiment of the grass collector venting cover assembly and cart shown in FIG. 1.

More particularly, as illustrated in FIG. 2, the embodiment of the cart 20 shown has a trailer box 200 to which the grass collector venting cover assembly 10 is connected. The trailer box 200 has attached thereto a cover support framework 210 rising above the trailer box 200 which supports the grass collector venting cover assembly 10. The support frame work 210 includes a vertical, U-shaped, frontal rod 220, the ends of which are fastened to a trailer box 200 by means of suitable fasteners 221. Preferably, the ends of the frontal rod 220 are positioned against the front inside corners of the trailer box 200 and securely affixed thereto. The cover support framework 210 also includes two U-shaped pivotal frame members, a support rod 222 and a frame rod 223, which are pivotally interconnected to the frontal rod 220 proximate the front end of the trailer box 200. The frontal rod 220, support rod 222 and frame rod 223 are preferably made of a rigid material such as steel. The frame rod 223 is sized and configured to match in width and length the trailer box 200, so that the cover assembly 10 and cart 20 cooperate to adequately enclose the space defined by the cover assembly 10 and trailer box 200 when the cover assembly 10 is in its downward position. Preferably, the support rod 222 is slightly narrower than the frame rod 223 to facilitate opening of the cover assembly 10 when the cart is filled with grass clippings.

Figure 3:
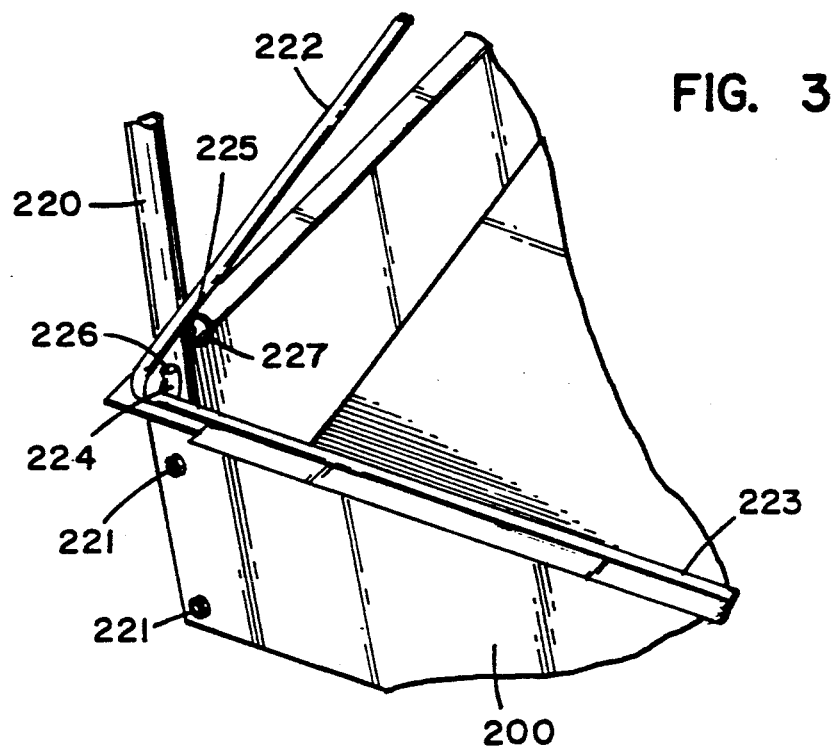
FIG. 3 is a partial view in perspective of the grass collector venting cover assembly and cart shown in FIG. 2.

As illustrated in FIG. 3 in the preferred embodiment, each end of the support rod 222 includes and integral eyebolt end 224, and each end of the frame rod 223 includes an integral bent end 225. The bent end 225 is inserted through the eyebolt end 224, and then through an aperture 226 in the frontal rod 220. The bent end 225 is then suitably fastened for a pivotal movement with a spring clip 227. The rods 222 and 223 and attached cover 230 can be easily removed from the trailer box 200 by removing the two spring clips 227. This allows the trailer box 200 to be used as general utility cart for general hauling purposes.

A flexible cover 230 encloses the trailer box 200 to provide an enclosed receptacle for grass clippings. The fabric cover 230 is sewn to include seam lines 237, 238 and 239 so that the cover 230 includes a front portion 234, rear portion 233, and side portions 231 corresponding generally to that of a trailer box 200.

Figure 4:
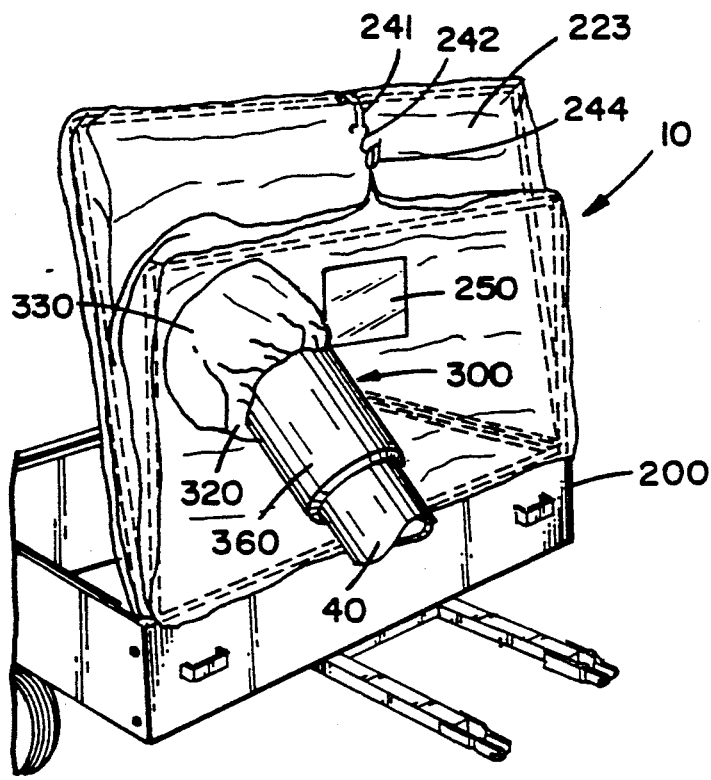
FIG. 4 is a perspective view of the front of the grass collector venting cover assembly and cart shown in FIG. 2.

The cover 230 also has sewn longitudinal sleeves 240 which enclose the pivotal support rod 222 and the frame rod 223. Preferably, the sleeves 240 encase the U-shaped rods 222 and 223 on each of their three sides. The back end of the cover 230 may include a strap 241 having a hook 242 which can be attached to a washer or ring 243 on the back end of a trailer box 200 to hold the cover 230 in place when in its enclosed configuration. The strap 241 can also be used to maintain the cover 230 in its open configuration when desired as shown in FIG. 4. After the support rod 222 and the frame rod 223 are pivoted to their upright position, the hook 242 of the strap 241 can be attached to a ring 244 on the front end of the fabric cover 230.

The front portion 234 and side portions 231 are constructed of a non-porous flexible material, such as a dacron polyester fabric. The rear portion 233 is constructed of a perforated polyvinyl chloride material. This type of fabric is sturdy and the porous sections allow the cover 230 to "breathe", resulting in unrestricted movement of the grass clippings into the grass collector.

The top portion of the cover 230 is defined by the seam lines 237, 238 and 239 is composed of two layers. The upper layer 235 is non-porous and the lower layer 236 is porous. The top portion's upper layer 235 and lower layer 236 are connected along the seam lines 237, 238 and 239 but are not connected at the rear of the cart. The two-layer construction of the top of the cover 230 and the porous material of the rear portion 233 directs exhaust and debris from the grass chute 40 to be directed away from the tractor 30.

A window 250 is also provided in the front portion 234 of the preferred embodiment of the cover 230 to allow the operator to view the amount of the grass clippings collected and determine when the trailer box 230 should be emptied.

In operation, the support rod 222 and the frame rod 223 are pivoted downward so that the fabric cover 230 forms an enclosure over the trailer box 200. The frame rod 223 is lowered to a substantially horizontal position proximate the upper edge 260 of the trailer box 200. The support rod 222 is lowered to an intermediate position oblique with respect to the trailer box 200 as shown in FIG. 2. The frontal support member 220 stays in a vertical position at all times because it is preferably rigidly secured to the trailer box 200. Because the fabric cover 230 is attached to the rods 222 and 223 by the sewn longitudinal sleeves 240 which encase the support rods, the fabric cover 230 folds down as the support rod 222 and frame rod 223 are pivoted to their downward position. The fabric cover 230 forms an enclosure over the trailer box 200 for receipt of grass clippings. FIG. 2 illustrates the positions of the support rod and the frame rod 223 as they are being lowered, before they are pivoted to their final downward position. After the support rod 222 and frame rod 223 are lowered, the position of the fabric cover 230 can be secured by attaching the strap 241 and hook 242 to the ring 243 located on the trailer box.

The cover 230 is secured to the front of the trailer box 200 by a pair of elastic cord loops 232 located proximate the front bottom corners of the cover 230. The elastic cord loops 232 slip over the upper threaded fasteners 221 to secure the front corners of the cover 230 to the trailer box 200.

Figure 5:
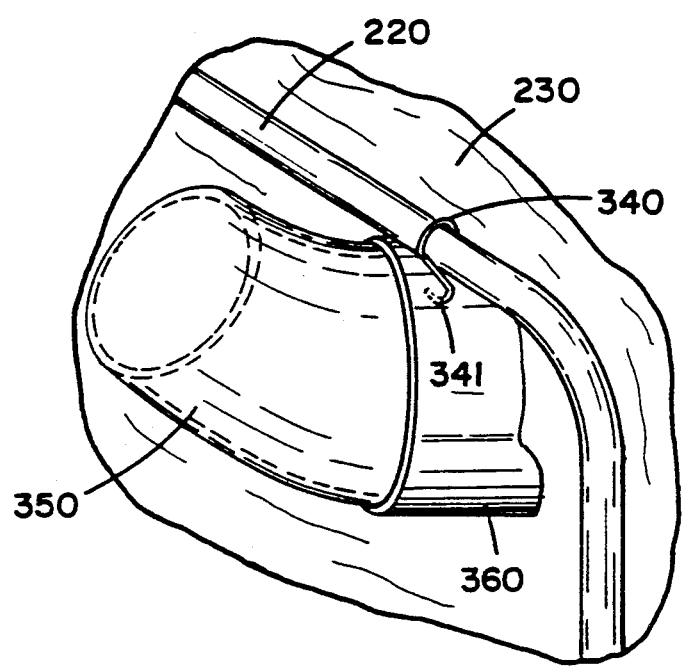
FIG. 5 is a partial view in perspective of the connection of the grass chute to the grass collector venting cover assembly of the present invention.

FIGS. 4 and 5 illustrate the preferred embodiment of the connection of the grass collector venting cover 10 to the grass chute 40 of the tractor 30. As illustrated, the grass chute 40 preferably enters the access port or opening 300 of the cover 230 in the front of the cover assembly 10. However, the present invention could also be adapted so that the grass chute 40 could also enter from the side of the cover assembly 10. Located inside the cover 230 proximate its front end is an outlet portion 350 of the grass chute 40. A plastic sleeve 360 is provided to facilitate connection between the grass chute 40 and the fabric cover 230. The grass chute 40 slides through the plastic sleeve 360 so that an outlet portion 350 of the chute 40 extends inside the cover 230. The cover 230 may include a fabric boot 330 sewn onto the cover 230 including an elastic like band 320 about the circumference thereof to facilitate a tight fit about the plastic sleeve 360.

FIG. 5 illustrates the preferred embodiment of the connection between the plastic sleeve 360 and the front support rod 220. One or more S-shaped clips 340 can be used to accomplish this connection and maintain the chute 360 in the proper position. One end of the S-shaped clip 340 attaches around the front rod 220, and the other end of the S-shaped clip 340 is inserted through an aperture 341 in the plastic sleeve 360. This connection enables the plastic sleeve 360 to be easily removed from the tractor's grass chute 40.

Figure 6:
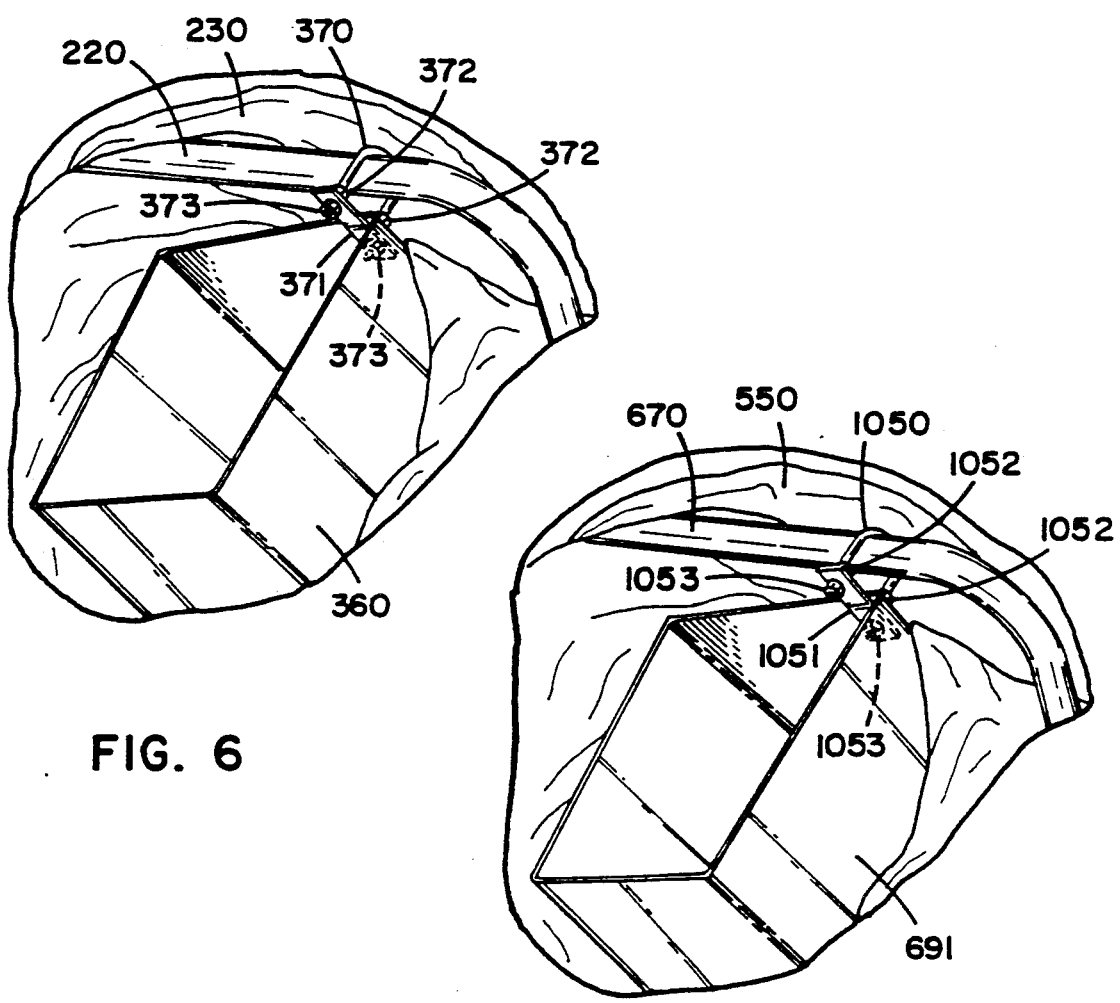
FIG. 6 is a partial view in perspective of an alternative embodiment of the connection of the grass chute to the grass collector venting cover assembly of the present invention.

FIG. 6 illustrates an alternative embodiment of the connection between the plastic sleeve 360 and the front support rod 220. This embodiment employs a U-bolt 370 threaded on both ends and a metal strap 371 adapted to fit on the ends of the U-bolt 370. The U-bolt 370 is placed over the front support rod 220 and a nut 372 is threaded on each end of the U-bolt 370. One end of the U-bolt is then inserted through an aperture in the plastic sleeve 360. The metal strap 370 is then placed on the U-bolt 370. Two lock nuts 373 are then placed on each end of the U-bolt 370 and the lock nuts 373 and nuts 372 are tightened to cooperate so as to hold the plastic sleeve 360 securely to the front support rod 220. This connection attaches the plastic sleeve 360 more securely to the front support rod 220.

When the trailer box 200 is being emptied, or when it is being used for another purpose the operator can collapse the cover assembly 10 into a substantially vertical upright position proximate the front end of the trailer box 200 as shown in FIG. 4. The rods 222 and 223 can be maintained in an upright configuration by attaching the strap 241 and hook 242 to a ring 244 on the front portion 234 of the cover 230. This facilitates loading and unloading of items from the trailer box 200. When the trailer box 200 requires emptying, the grass chute 40 is disconnected from the cover 230 and the plastic sleeve 360. The pivotal rods 222 and 223 are pivoted to a vertical upright position in order to collapse the cover 230 and expose the trailer box.

An alternate embodiment of the grass collector/bagger is shown in FIG. 7, generally designated by the reference number 510 and interconnected to a tractor 520 and the grass chute 530 thereof. The grass collector/bagger 510 is connected to the tractor 520 by a rigid hitch mechanism 540.

More particularly, as illustrated in FIG. 8, the collector support framework 600 includes an H-shaped support framework 610, a front support plate 620, two side support plates 630, two side braces 640, a middle brace 650, a front brace 660 and suitable fasteners for connecting the above parts. The side support plates 630 include retaining lips 631 along their rear edge to retain a removable rigid bin 700 on the collector support framework 600.

FIG. 8 illustrates that also attached to the collector support framework 600 is a U-shaped frontal support rod 670. The frontal support rod 670 is attached proximate the front of the side support plates 630 with suitable fasteners. The front brace 660 is attached to the frontal rod 670 with suitable fasteners. The side braces 640 are attached to the side support plates 630 on one end and the frontal support rod 670 and front brace 660 on the other end.

The collector support framework 600 is supported above the ground by wheels 680 proximate the back end of the H-shaped support framework 610. The wheels 680 are mounted on swivel assemblies 681 which are in turn mounted proximate the rear of the H-shaped support framework 610.

The swivel assemblies 681 allow for 360 degree pivotal motion about a vertical axis. The swivel assemblies 681 and wheels 680 are commercially available swivel wheel assemblies with encased bearings. The swivel assemblies 681 are largely spindleless so as to reduce the overall height of the grass collector/bagger assembly 510. The axis about which the wheels 680 pivot is slightly offset from the vertical as is common with many such swivel assemblies. The weight distribution of the grass collector/bagger 510 is such that the wheels 280 will readily swivel when the collector/bagger 510 is backed up.

The ends 611 and 612 of the rectangular member 613 extend beyond the H-shaped support framework 610, with the wheels 680 being positioned on each end of the rectangular member 613. If the grass chute outlet tube 691 is positioned at the front of the collector/bagger 510, the center of the collector/bagger 510 can be offset to accommodate the front entry. As shown in FIG. 8, the offset end 612 of the rectangular member 613 is longer than the end 611. In the alternative, the entire hitch and support framework could be offset with respect to the tractor.

The H-shaped support framework 610 also includes two longitudinally extending, spaced apart elongated rectangular members 614 interconnected by a transversely extending elongated rectangular member 619. The longitudinally extending elongated members 614 include clevis-like front ends 615 having a U-shaped configuration with a pair of horizontally apertures 616. The apertures 616 are adapted to removably receive a clevis pin 617 which, in turn, is adapted to removably receive a cotter pin 618.

Figure 9:
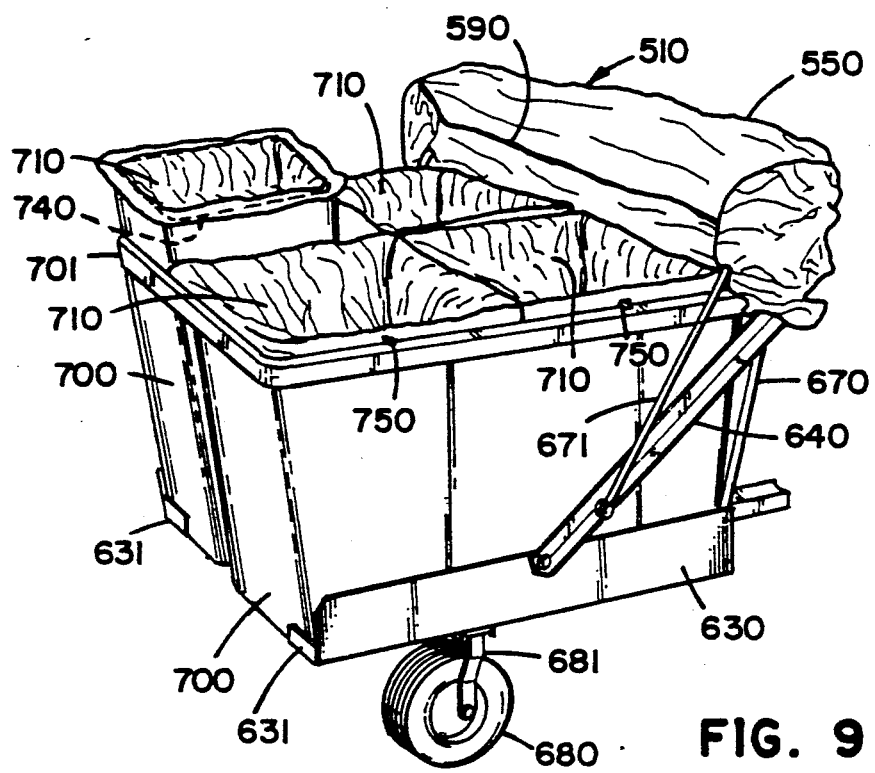
FIG. 9 is a perspective view of the collector/bagger assembly in which the cover is folded forward and the rigid bins and insert containers are exposed, with one insert container partially removed from its rigid bin.

FIG. 9 illustrates the preferred embodiment in which two removable rigid bins 700 are positioned on the collector support framework 600. After the grass collector/bagger 510 has been used and needs emptying the cover 550 is removed from the bins 700 and folded forward proximate the front end of the collector/bagger 510 by pivoting the middle support rod 671 forward about the points 641 on the side braces. The removable rigid bins 700 and their insert containers 710 are thereby exposed, allowing an operator to empty them.

In the preferred embodiment the rigid bins 700 are molded of a black polyethylene. That material is durable, lightweight, and resists deterioration caused by ultra-violet radiation. The bins are preferably of a solid construction, however, drain holes can be put into the bottoms of the rigid bins 700 to allow water and other debris to drain out of the rigid bins 700.

As shown in FIGS. 9 and 10, in the preferred embodiment each insert container 710 can be removed individually from its removable rigid bin 700 allowing the operator to easily empty the material into a garbage container or dumpster. The smaller size of the insert containers 710 allows them to be lifted more easily than the larger removable rigid bins 700. In the preferred embodiment, the insert containers 710 are bags constructed of a polyester fabric which allows the insert containers 710 to "breathe". A metal rod 740 is contained in a sleeve 730 which runs around the circumference of the opening of the insert container 710. The container 710 also has a handle 760 attached to its bottom. The structural member 740 and handle 760 allow the operator to more easily empty the insert container 710. The structural member 740 is also useful in keeping the insert container 710 open and able to receive material.

A detailed cross-sectional view of the preferred embodiments of the rigid bins 700, insert containers 710 and cover 550 is shown in FIG. 10. In the preferred embodiment each insert container 710 sits inside a rigid bin 700 and is supported along its upper edge by a molded ledge 703 in the bin 700. A structural member 740 is enclosed in a sleeve 730 located around the circumference of the opening of the insert container 710. The structural member 740 is preferably a steel or metal rod shaped so as to fit inside the rigid bin 700.

Also shown in FIG. 10 is the tapering of the insert container 710. The polyester cloth 720 of the insert container 710 is sized so as to not contact the sides of the rigid bin 700 when the container 710 is full of material to allow it to be easily removed from the bin 700. Each insert container 710 also has a handle 760 attached to its bottom to aid in the emptying of the insert containers 710. The structural member 740 also serves as an aid in emptying the insert container 710 by allowing the operator to grasp the top of the container 710 firmly.

The insert container 710 is retained within the rigid bin 700 by retaining clips 750 attached to the rigid bin 700 by suitable fasteners 751, such as nuts and bolts or rivets. The retaining clips 750 cooperate with the structural members 740 and the ledge 703 of the rigid bin 700 to hold the insert container 710 in place during use.

Also shown in FIG. 10 is the cooperation between the rigid bin 700, the rigid bin's lip 701 and the cover 550. The cover 550 contains a sleeve 561 sewn along its bottom edge. Contained in the sleeve 561 is an elastic cord 590 which cooperates with the lip 701 of the bins 700 to hold the cover 550 in its closed position over the bins 700.

Also shown in FIG. 10 is the ridge 704 molded along the circumference of the bottom of the rigid bin 700. The ridge 704 gives the operators a hand hold for unloading the rigid bins 700.

In an alternative embodiment of the present invention the removable rigid bins 700 are used without the insert containers 710. That embodiment is useful when the collector/bagger assembly 510 is used to collect materials light enough to allow the operator to empty the entire removable rigid bin 700 at one time.

As illustrated in FIG. 7, the preferred embodiment of the grass collector/bagger assembly 510 includes a flexible cover 550. The flexible cover 550 encloses the removable rigid bins 700 when in its closed position as shown in FIG. 7. The cover 550 includes a front portion 555, two side portions 552, a rear portion 551, a top portion upper layer 554, and a top portion bottom layer 553.

The cover 550 is supported above the removable rigid bins 700 by a frontal support rod 670 and a support rod 671. The support rod 671 is pivotally attached to the location 641 on the side braces 640 of the collector support framework 600. The support rod 671 is preferably made of a rigid material such as steel and is sized to adequately support the cover 550 above the rigid bins 700. The cover 550 has a longitudinal sleeve 560 which encloses the support rod 671. Prior to attaching the support rod 671 to the side braces 640 the support rod 671 is threaded through the longitudinal sleeve 560 of the cover 550. Preferably, the sleeve 560 encases the U-shaped support rod 671 on each of its three sides.

The bottom edge of the front portion 555 of the cover 550 is connected to the front brace 660 of the collector support framework 600 by suitable fasteners. The front portion 555, side portions 552 and upper layer of the top portion 554 are all constructed of a flexible non-porous material, such as a dacron polyester fabric. The rear portion 551 and lower layer of the top portion 553 are constructed of a perforated polyvinyl chloride material because of its durability and easy clean-up.

The upper layer of the top portion 554 and the lower layer of the top portion 553 are connected along their sides and proximate the front of the collector/bagger. The two layers 553 and 554 are not connected proximate the rear of the collector/bagger to allow the cover 550 to vent debris and exhaust from the grass chute 530 away from the tractor 520.

A window 580 is also provided in the front portion 555 of the preferred embodiment of the cover 550 to allow the operator to view the amount of material collected and determine if the collector/bagger assembly 510 should be emptied.

In operation, the support rod 671 is pivoted toward the rear of the collector/bagger assembly 510 so that the flexible cover 550 forms an enclosure over the removable rigid bins 700. The support rod 671 is moved to an intermediate position oblique with respect to the surface of the ground as shown in FIG. 7. The frontal support rod 670 stays in a substantially vertical position at all times because it is preferably rigidly secured to the collector support framework 600. Because the flexible cover 550 is attached to the support rod 671 by the longitudinal sleeve 560 which encases the support rod 671, the flexible cover 550 folds back as the support rod 671 is pivoted to the rear of the collector/bagger assembly 510. After the support rod 671 is pivoted rearward, the flexible cover 550 is secured around the top edge 701 of the removable rigid bins 700 by an elastic member 590 contained in a sleeve 561 proximate the outer edge of the cover 550. The elastic member 590 and upper edge of the removable rigid bins 701 cooperate to hold the cover 550 in its closed position over the removable rigid bins 700. It will be appreciated that methods other than an elastic member 590 might be utilized to retain the cover 550 over the bins 700.

Figure 11:
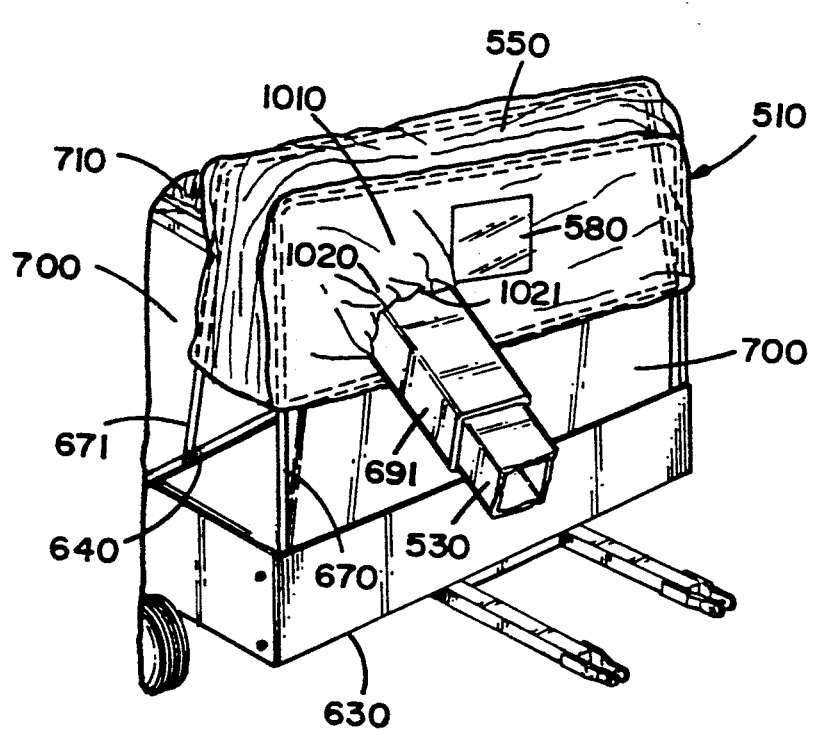
FIG. 11 is a partial view in perspective of the preferred embodiment of the collector/bagger assembly with the cover in its open position.

In its open position, the cover 550 of the collector/bagger assembly 510 is located proximate the front end of the collector/bagger assembly 510, as illustrated in FIG. 11. In that position the support rod 671 is rotated towards the front of the collector/bagger assembly 510.

Figure 12:
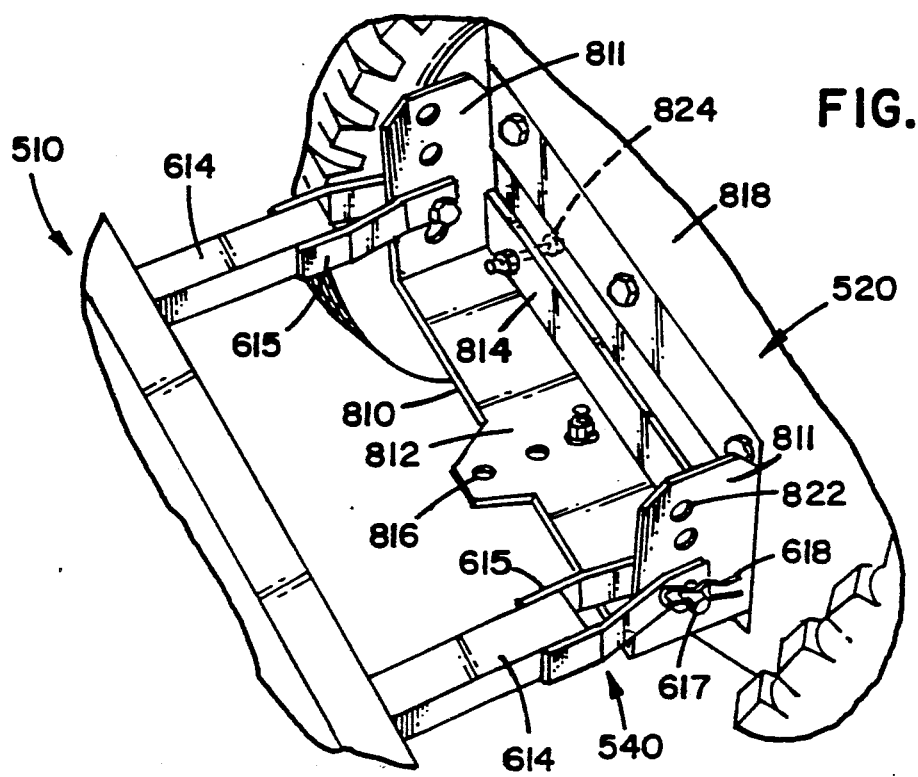
FIG. 12 is a partial view in perspective of an embodiment of a rigid mounting hitch in accordance with the principles of the present invention.

The preferred embodiment shown in FIGS. 7 and 12 includes a rigid mounting hitch 540 attached to the drawbar (not shown) of the tractor 520 and interconnected to the grass collector/bagger assembly 510. The rigid mounting hitch 540 includes a generally U-shaped bracket 810 including two spaced apart vertically extending legs 811 interconnected by a horizontally extending support member 812. In the embodiment shown, a horizontally extending, vertically upright elongated brace member 814 extends between the vertically extending legs 811. The horizontal support member 812 includes a plurality of aligned apertures 816 positioned at varying distances from a back plate 818 of the tractor. In the embodiment shown, the aperture 816 closest to the back plate 818 receives a suitable fastener 820 for attachment of the rigid hitch 540 to the drawbar of the tractor 520. The U-shaped bracket 810 serves as an extension of the drawbar as the outer most aperture 816 serves as aperture for interconnecting other utility carts or the like to the rigid hitch 540 when the collector/bagger assembly 510 of the present invention is removed therefrom. The vertically extending legs 811 include a plurality of vertically aligned apertures 822 at varying vertical heights, the corresponding apertures in each of the respective legs 811 being aligned with one another. A plurality of apertures 822 are included to give the operator a variety of heights at which to attach the collector/bagger assembly 510 to the tractor 520. That allows the operator to attach the collector/bagger assembly 510 to the tractor 520 in such a way as to keep the bottom of the collector/bagger assembly 510 substantially level with the surface of the ground which is its preferred orientation. The apertures 822 in the preferred embodiment are substantially circular but it will be appreciated that the apertures 822 could be elliptical with a longer vertical axis to allow some rotation of the collector/bagger assembly 510 around a vertical axis.

The legs 811 are adapted to receive the clevis like ends 615 of the H-shaped support frame 610. Accordingly, to attach the collector/bagger assembly 510 to the rigid hitch 540, the apertures 616 of the ends 615 are aligned with selected apertures 822 in the legs 811 and a clevis pin 617 is inserted therethrough. A cotter pin 618 is then inserted through the clevis pin 617.

This provides for a vertically pivotal connection of the collector/bagger assembly 510 to the rigid hitch 540 and substantially prevents horizontal pivotal movement about a vertical axis at the ends 615. Furthermore, support is provided for each of the ends 615, thereby providing the collector/bagger 510 with improved handling characteristics. The multi-purpose cart 510 due to this two-point hitch connection, will not jackknife and will also pivot up and down over uneven ground. The brace member 814 in the embodiment shown in FIG. 12 includes fastener members 824 for fastening the U-shaped bracket 810 to the back plate 818 of the tractor 520 to keep the U-shaped bracket rigid and prevent pivoting about the fastener 820.

It will be appreciated that rigid attachment of the collector/bagger 510 to a tractor 520 by any number of plurality of points which allows vertical pivotal movement of the collector/bagger will enjoy the same advantage as the two-point attachment of the preferred embodiment.

In the alternative, the grass collector/bagger assembly 510 could be rigidly attached directly to the tractor 520 by suitable fasteners such as bolts. This attachment would prohibit jackknifing by preventing relative pivotal motion between the collector/bagger 510 and the tractor 520 about both a horizontal and a vertical axis.

Figure 13:
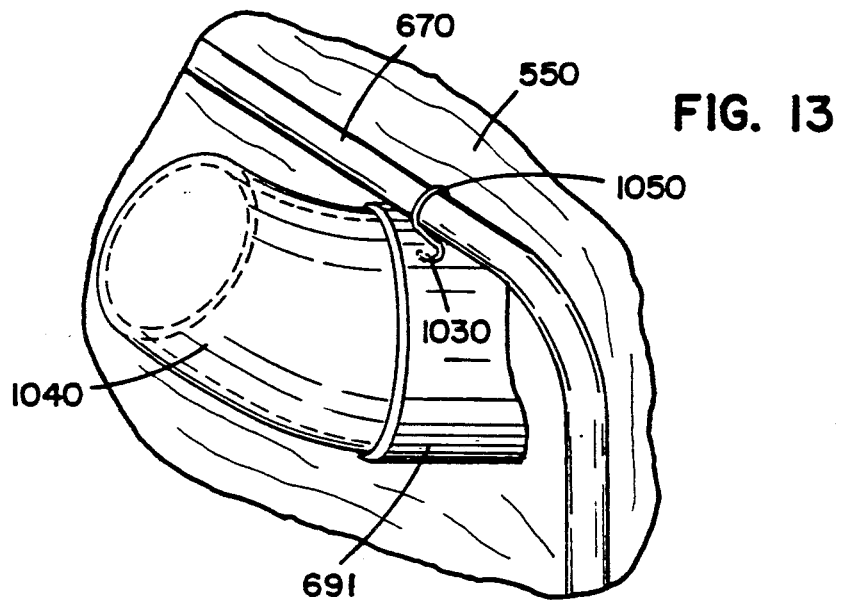
FIG. 13 is partial view in perspective of one embodiment of the connection of the grass chute to the grass collector/bagger assembly of the present invention.

FIGS. 11 and 13 illustrate the preferred embodiment of the connection of the grass collector/bagger 510 to the grass chute 530. As illustrated, the grass chute 530 preferably enters the access port or opening 1020 of the cover 550 in the front of the collector/bagger 510. However, the present invention could also be adapted so that the grass chute 530 could enter from the side of the collector/bagger 510. Located inside the cover 550 proximate its front end is an outlet portion 1040 of the grass chute 530. A plastic sleeve 691 is provided to facilitate connection between the grass chute and the fabric cover 550. The grass chute 530 slides through the plastic sleeve 691 so that an outlet portion 1040 of the chute 530 extends inside the cover 550. The cover 550 may include a fabric boot 1010 sewn onto the cover 550 including an elastic-like band 1021 about the circumference thereof to facilitate a tight fit about the plastic sleeve 691.

FIG. 13 illustrates the connection between the plastic sleeve 691 and the front support rod 670. One or more S-shaped clips 1050 can be used to accomplish this connection and maintain the chute 691 in the proper position. One end of the S-shaped clip 1050 attaches around the front rod 670, and the other end of the S-shaped clip 1050 is inserted through an aperture 1030 in the plastic sleeve 691. This connection enables the plastic sleeves 691 to be easily removed from the tractors grass chute 530.

Figure 14:
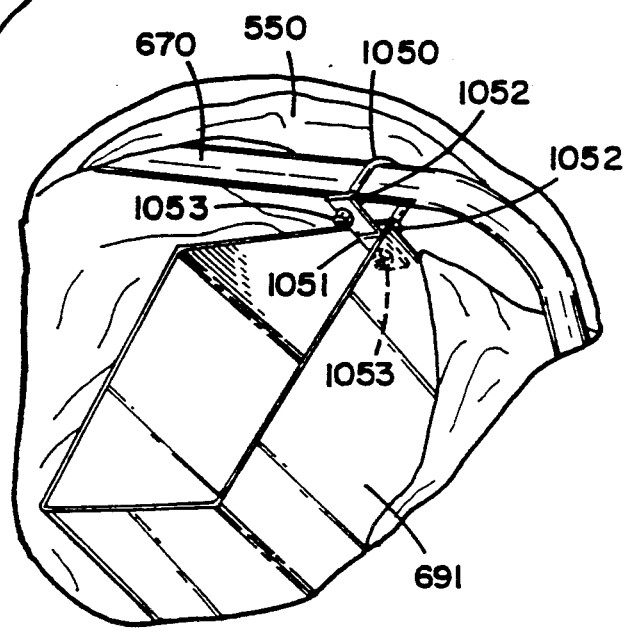
FIG. 14 is a partial view in perspective of an alternative embodiment of the connection of the grass chute to the grass collector/bagger assembly of the present invention.

FIG. 14 illustrates an alternative embodiment of the connection between the plastic sleeve 691 and the front support rod 670. This embodiment employs a U-shaped bolt 1050 threaded on both ends and a short metal strap 1051 adapted to fit on both ends of the U-bolt 1050. The U-bolt 1050 is placed over the front support rod 670 and a nut 1052 is threaded on each end of the U-bolt 1050. One end of the U-bolt is inserted through an aperture in the plastic sleeve 691. The metal strap 1051 is then placed on the U-bolt 1050. Two lock nuts 1053 are then placed on each end of the U-bolt 1050 and the lock nuts 1053 and nuts 1052 are tightened to cooperate so as to hold the plastic sleeve 691 securely to the front support rod 670.

An alternate embodiment of the grass collector/bagger 1500 is shown on FIG. 15. In that embodiment the cover 1510 is at least partially constructed of a rigid or semi-rigid material, such as plastic. The cover 1510 is attached to hinges 1550 at its front which allow the cover to be tilted forward to expose the top of the collector/bagger assembly 1500. As with the preferred embodiment, the cover 1510 retains the two-layer top configuration with the upper layer 1540 being non-porous and the bottom layer 1530 being porous. The rear portion 1520 remains porous as in the preferred embodiment.

It will be appreciated that although the embodiment of the invention illustrated is shown in use with a tractor having high lift blades which generate sufficient force to transport the clippings into the enclosed trailer box, the present invention might also be used with those tractors having convention blades and utilizing an auxiliary engine driven blower or mower belt driven blower to provide sufficient force to transport the clippings into the bagger. Further, it will be appreciated that the grass chute 530 might have any number of configurations. For example, although not shown, most grass chutes are removable from the mower housing.

It is to be understood, however, that even though numerous characteristics and advantages of the invention have been set forth in the foregoing description, together with details of the structure and function of the invention the disclosure is illustrative only, and changes may be made in detail, especially in matters of shape, size and arrangement of parts within the principles of the invention, to the full extend indicated by the broad general meaning of the terms in which the appended claims are expressed.

I claim:

1. A grass collector/bagger assembly having its front end adapted for attachment to a rear of a tractor and a back end opposite the front end, the tractor having a mower platform with a grass chute projecting therefrom, the collector/bagger assembly comprising:
(a) a collector support framework adapted for hauling rigid bins;
(b) at least one wheel supporting the collector support framework above the surface of the ground;
(c) at least two removable rigid bins supported above the surface of the ground by the collector support framework, the bins having a bottom, top and rim around each top;
(d) two or more reusable, flexible insert containers adapted to fit inside each removable rigid bin, the insert containers having a rigid structural portion about their openings adapted for keeping the insert container open, the structural portion of the insert containers cooperating with the rim of the bin to suspend the insert containers in the rigid bin, the reusable insert containers also being adapted for easy removal from each rigid bin;

(e) a flexible cover adapted to cover the rigid bins to contain grass clippings and other material within a space defined by the cover and removable rigid bins, the cover including an opening adapted to receive the grass chute of the mower; and (f) a cover support assembly attached to the collector support framework and cover, the cover support assembly adapted to support the cover above the rigid bins.

2. The collector/bagger assembly of claim 1, wherein the collector support framework has a front end proximate the rear of the tractor and a back end facing away from the tractor, the collector support framework including rigid hitch means proximate the front end of the collector support framework for attachment to the tractor, the rigid hitch means providing for pivotal movement about a horizontal axis proximate the rigid hitch means and substantially prohibiting movement about a vertical axis.

3. The collector/bagger assembly of claim 2, wherein the wheel is pivotally interconnected to the collector support framework for pivotal motion, the wheel being located closer to the back end of the collector support framework than to the front end of the collector support framework.

4. The collector/bagger assembly of claim 1, wherein the collector support framework includes a middle brace means for stiffening the collector support framework and for separating the rigid bins.

5. The collector/bagger assembly of claim 1, wherein the cover support assembly includes at least one framework member interconnected to the collector support framework for pivotal movement about a horizontal axis and toward the front end of the collector/bagger assembly.

6. The collector/bagger assembly of claim 5, wherein the cover support assembly and cover are changeable from a closed position enclosing the removable rigid bins when the framework member is pivoted toward the back end of the collector/bagger assembly to an open position exposing the removable rigid bins when the framework member is pivoted toward the front end of the collector/bagger assembly, the cover support assembly and cover being substantially proximate the front end of the collector/bagger assembly when the cover support assembly and cover are in the open position.

7. The collector/bagger assembly of claim 5, wherein the cover support assembly further comprises:

(a) a U-shaped frontal rod having two substantially vertical portions secured proximate front corners of the collector support framework and a substantially horizontal portion interconnecting the two vertical portions; and (b) a U-shaped support rod, each end of which is pivotally interconnected to the collector support framework for pivotal motion about a horizontal axis disposed proximate the midpoint of the length of the grass collector/bagger assembly as measured from the front end to the back end thereof, the support rod being rotatable between an upright open position and a downward, oblique, closed position.

8. The collector/bagger assembly of claim 1, wherein the cover has a front, two side, rear, and top portions such that:

(a) the front portion being substantially non-porous and disposed proximate the front of the collector/bagger assembly;

(b) the two side portions being disposed along sides of the collector/bagger assembly and being substantially non-porous;

(c) the rear portion being disposed opposite the front portion with an outer surface facing primarily away from the tractor, the rear portion being substantially porous; and (d) the top portion being disposed primarily in a horizontal plane above the rigid bins and being connected to the front, rear and side portions, the top portion comprising upper and lower layers, the upper layer being substantially non-porous and the lower layer being substantially porous, the two layers being connected to each other so as to vent exhaust and debris blown into the space formed by the cover and rigid bins away from the tractor.

9. The collector/bagger assembly of claim 1, wherein the removable rigid bins include a ridge located around the perimeter of the bottoms of the bins, adapted to provide a handhold on the bottoms.

10. The collector/bagger assembly of claim 1, wherein the reusable, flexible insert containers are primarily constructed of a cloth fabric.

11. A grass collector/bagger assembly having a front end adapted for attachment to a rear of a tractor and a back end opposite the front end, the tractor having a mower platform with a grass chute projecting therefrom, the collector/bagger assembly comprising:

(a) a collector support framework adapted for hauling rigid bins;

(b) at least one wheel supporting the collector support framework above the surface of the ground;

(c) at least two removable rigid bins supported above the surface of the ground by the collector support framework, the bins having a bottom, top, and a rim around each top;

(d) two or more flexible insert containers adapted to fit inside each removable rigid bin, the insert containers also being adapted for easy removal from each rigid bin;

(e) a cover adapted to cover the rigid bins to contain grass clippings and other material within a space defined by the cover and removable rigid bins, the cover including an opening adapted to receive the grass chute of the mower; and (f) a cover support assembly attached to the collector support framework and cover, the cover support assembly adapted to support the cover above the rigid bins, the cover support assembly further comprising:

(a) a U-shaped frontal rod having two substantially vertical portions secured proximate front corners of the collector support framework and a substantially horizontal portion interconnecting the two vertical portions; and (b) a U-shaped support rod, each end of which is pivotally interconnected to the collector support framework for pivotal motion about a horizontal axis disposed proximate the midpoint of the length of the grass collector/bagger assembly as measured from the front end to the back end thereof, the support rod being rotatable between an upright open position and a downward, oblique, closed position.

12. A grass collector/bagger assembly having its front end adapted for attachment to a rear of a tractor and a back end opposite the front end, the tractor having a mower platform with a grass chute projecting therefrom, the collector/bagger assembly comprising:

(a) a collector support framework adapted for hauling elongated rigid bins;

(b) at least one wheel supporting the collector support framework above the surface of the ground;

(c) at least two removable, elongated rigid bins supported above the surface of the ground by the collector support framework, the bins having a bottom, top and rim around each top, the bins further having an elongated shape in that their length is substantially twice the width of the rigid bins, the bins also being supported so that their length is aligned between the front end and back end of the grass collector/bagger assembly;

(d) a cover adapted to cover the elongated rigid bins to contain grass clippings and other material within a space defined by the cover and removable, elongated rigid bins, the cover including an opening adapted to receive the grass chute of the mower; and (f) a cover support assembly attached to the collector support framework and cover, the cover support assembly adapted to support the cover above the rigid bins.

13. The collector/bagger assembly of claim 12, further comprising two or more insert containers of substantially equal size adapted to fit inside each elongated, removable rigid bin, the insert containers being adapted for easy removal from each rigid bin.

* * * * *